(12) United States Patent
Marchant et al.

(10) Patent No.: US 6,186,266 B1
(45) Date of Patent: Feb. 13, 2001

(54) STEERABLE TAG AXLE SYSTEM

(75) Inventors: Alan Marchant, Turlock; William R. West, Oakdale, both of CA (US)

(73) Assignee: Marchant Waste Managers, Turlock, CA (US)

(*) Notice: Under 35 U.S.C. 154(b), the term of this patent shall be extended for 0 days.

(21) Appl. No.: 09/376,674

(22) Filed: Aug. 18, 1999

Related U.S. Application Data

(60) Provisional application No. 60/097,662, filed on Aug. 24, 1998.

(51) Int. Cl.[7] ..................................................... B62D 5/20
(52) U.S. Cl. ........................ 180/409; 180/414; 180/236; 280/103; 280/91.1
(58) Field of Search .................................... 180/234, 236, 180/408, 409, 410, 414, 419, 442; 280/99, 103, 419, 443, 91.1

(56) References Cited

U.S. PATENT DOCUMENTS

| | | | |
|---|---|---|---|
| 2,359,978 | 10/1944 | Edwards | 280/33.1 |
| 3,393,922 | 7/1968 | Adams | 280/423 |
| 4,586,578 | 5/1986 | Brown et al. | 180/14.4 |
| 4,781,262 | * 11/1988 | Nakamura et al. | 180/140 |
| 4,821,830 | * 4/1989 | Tomoda et al. | 180/140 |
| 5,135,064 | 8/1992 | Ducote | 180/24.01 |
| 5,244,226 | 9/1993 | Bergh | 280/442 |
| 5,329,451 | 7/1994 | Notsu | 364/424.05 |
| 5,364,116 | 11/1994 | Houle et al. | 280/442 |
| 5,435,407 | * 7/1995 | Renfroe | 180/79 |
| 5,700,023 | 12/1997 | Picard | 280/426 |
| 5,899,292 | * 5/1999 | Paul et al. | 180/419 |

FOREIGN PATENT DOCUMENTS

| | | | |
|---|---|---|---|
| 577571 | * 1/1994 | (EP) | 280/419 |
| 2549794 | * 2/1985 | (FR) | 280/419 |
| 1293062 | * 2/1987 | (SU) | 280/419 |

* cited by examiner

*Primary Examiner*—Brian L. Johnson
*Assistant Examiner*—Avraham H. Lerner
(74) *Attorney, Agent, or Firm*—Townsend and Townsend and Crew LLP (57) ABSTRACT

A steering system (11) reduces the steering radius and minimizes tire scuffing is used with vehicles which include a front steering assembly having first and second wheels (20a, 20b) and a tag axle steering assembly having third and fourth wheels (21a, 21b). The steering system comprises a front steering ram assembly (26) fluidly coupled to a tag axle ram assembly (30) through a conduit system (102), which has no flow control valves, in a master-slave configuration such that a hydraulic fluid moves between the steering axle assembly and the tag axle ram assembly in response to a turning of the first and second wheels to cause the third and fourth wheels to turn in an opposite direction. The front steering ram assembly comprises first and second ram (42, 44). The first and second ram cylinders (46, 52) are normally affixed to either the frame (40) or the first tie rod (36), while the first and second ram shafts (50, 56) are affixed to the other of the frame and the first tie rod. The tag axle ram assembly typically includes third and fourth rams (72, 74). The third and fourth ram cylinders (76, 82) are typically affixed to either the frame (64) or the second tie rod (66), while the third and fourth ram shafts (80, 86) are affixed to the other of the frame and the second tie rod. The diameters of the third and fourth cylinders are larger than the diameters of the first and second cylinders, so that the third and fourth wheels turn less than the first and second steerable wheels.

16 Claims, 5 Drawing Sheets

STEERABLE TAG AXLE SYSTEM

CROSS-REFERENCES TO RELATED APPLICATIONS

This application claims the benefit of U.S. Provisional Patent Application Ser. No. 60/097,662 filed Aug. 24, 1998 for "Steerable Tag Axle System," the disclosure of which is incorporated herein by reference.

BACKGROUND OF THE INVENTION

The present invention is generally related to improved steering devices for vehicles, and more particularly to steering devices for vehicles having a steerable rear tag axle.

As the population of the world has escalated, the amount of waste produced has risen and the need for larger refuse trucks having a higher carrying capacity has intensified. However, with the increase in size and length of the trucks, it is becoming more difficult for the larger refuse trucks to maneuver through the city streets, cul-de-sacs and alleyways. Additionally, many state and federal laws limit the length between the axles and the maximum gross vehicle weight. To comply with these laws, an additional axle, otherwise known as a tag axle, is mounted rearward of the drive axle to accommodate the additional weight of the vehicle. The three conventional types of tag axles are fixed tag axles, self-steering tag axles and steerable tag axles. The conventional tag axles, however, suffer from a number of disadvantages.

Fixed axles typically do not turn and are often used as a second drive axle. Fixed axles do not reduce the turning radius, and can actually increase the steering radius of the vehicle because the fixed tag axle push the drive tires through the turn. Moreover, the fixed tag axle tires often scuff during the turning of the vehicle, which reduces the life of the tires and increases the cost of maintenance for the vehicle.

Conventional self-steering tag axles turn independently of the front steering axle and must overcome a certain amount of resistance to move from its straight orientation to a turning orientation. Because the self-steering tag axle systems must overcome the resistance, excessive tire wear and tire scuffing often occurs. Moreover, conventional self-steering tag axles must often be locked in a straight orientation or raised off of the ground entirely when the vehicle moves in reverse. Such configurations do not improve the steering radius of the vehicle, and can actually detrimentally affect the other axles when the vehicle moves in reverse.

Conventional steerable tag axle systems, such as those described in U.S. Pat. Nos. 5,364,116, 5,329,451 and 5,135,064, use a complex and expensive system of control valves and linkages to help turn the tag axle wheels. Although these steerable tag axle systems can provide a tighter turning radius than the fixed or self-steering tag axles, because these conventional steerable tag axles are so complex, additional maintenance is often required.

SUMMARY OF THE INVENTION

The present invention is broadly directed to an improved steering assembly for improving the steering of motorized vehicles, and in particular large vehicles having a tag axle. The steering system improves steering by reducing the turning radius of the vehicle and reducing tire scuffing of the tag axle wheels by using a closed, essentially valveless conduit system to move a hydraulic fluid between a front steering assembly and the tag axle steering assembly. By having a master-slave steering configuration, in contrast to conventional tag axle systems, the present invention does not require a complex system of valves, pumps and linkages to turn the wheels of the tag axle steering assembly. By using this simple steerable tag axle assembly the present invention provides a much simpler, cheaper, and more effective steering assembly than conventional fixed, self-steering and steerable tag axle assemblies.

In a first aspect, the present invention provides an improved steering assembly for a vehicle of the type having a steering axle and a tag axle assembly mounted to a frame. The steering axle assembly comprises first and second steerable wheels and a tie rod operatively connecting the first and second wheels. The tag axle assembly includes third and fourth wheels and a second tie rod which operatively connects the third and fourth wheels. The improved steering assembly has a steering axle ram assembly fluidly connected to a tag axle ram assembly through a conduit system such that a fluid moves between the steering axle ram assembly and the tag axle ram assembly in response to a turning of the first and second steerable wheels to cause third and fourth wheels to turn in unison. The steering axle ram assembly preferably comprises a first ram having a first cylinder, a first piston reciprocally housed within the first cylinder and a first shaft connected to the first piston, and a second ram having a second cylinder, a second piston reciprocally housed within the second cylinder and a second shaft connected to the second piston. The first and second cylinders are affixed to either the frame or the first tie rod, while the first and second shafts are affixed to the other of the frame and the first tie rod. The tag axle ram assembly typically includes a third ram having a third cylinder, a third piston reciprocally housed within the third cylinder, and a third shaft connected to the third piston, and a fourth ram having a fourth cylinder, a fourth piston reciprocally housed within the fourth cylinder, and a fourth shaft connected to the fourth piston. The third and fourth cylinders are typically affixed to either the frame or the second tie rod, while the third and fourth shafts are affixed to the other of the frame and the second tie rod. The diameters of the third and fourth cylinders are larger than the diameters of the first and second cylinders, so that the third and fourth wheels turn less than the first and second steerable wheels. A conduit system fluidly couples (1) the first and third cylinders, and (2) the second and fourth cylinders. A fluid moves through the conduit system between the steering axle ram assembly and the tag axle ram assembly in response to the turning of the first and second steerable wheels. The third and fourth wheels turn in unison at a lesser distance than the first and second steerable wheels.

In a second aspect, the present invention provides an improved vehicle having a steering axle assembly and a tag axle assembly mounted to a frame. The steering axle assembly comprises first and second steerable wheels and a first tie rod operatively connecting the first and second steerable wheels. The tag axle assembly comprises third and fourth wheels and a second tie rod operatively connecting the third and fourth wheels. The vehicle includes a steering axle ram assembly fluidly coupled to a tag axle ram assembly through a conduit system so that a fluid moves through the conduit system between the steering axle ram assembly and the tag axle ram assembly in response to the turning of the first and second steerable wheels, such that the third and fourth wheels turn in unison with the first and second steerable wheels. The steering axle ram assembly preferably comprises a first ram having a first cylinder, a first piston reciprocally housed within said first cylinder, and a first shaft connected to said first piston, and a second ram having a second cylinder, a second piston reciprocally housed within said second cylinder, and a second shaft connected to said second piston. The first and second cylinders are affixed to either the frame or the first tie rod, and the first and second shafts are affixed to the other one of the frame and the first tie rod. Similarly, the tag axle ram assembly comprises a third ram having a third cylinder, a third piston reciprocally housed within the third cylinder, and a third shaft connected to the third piston, and a fourth ram having a fourth cylinder, a fourth piston reciprocally housed within the fourth cylinder, and a fourth shaft connected to said fourth piston. The third and fourth cylinders are affixed to either the frame or the second tie rod while the third and fourth shafts are affixed to the other one of the frame and the second tie rod. The third and fourth cylinders have larger diameters than the first and second cylinders so that the third and fourth wheels turn a lesser distance than the first and second steerable wheels. Such a system can reduce the complexity and cost of the system, while maintaining safety and turning effectiveness.

In yet another aspect, the present invention provides a steerable tag axle kit for use with a vehicle having a steering axle assembly and a tag axle assembly mounted to a frame. The steering axle assembly is of the type which comprises first and second steerable wheels and a first tie rod operatively connecting the first and second steerable wheels. The tag axle assembly is of the type which comprises third and fourth wheels and a second tie rod operatively connecting the third and fourth wheels. The kit includes a steering axle ram assembly comprising a first ram having a first cylinder affixed to the frame, a first piston reciprocally housed within the first cylinder, and a first shaft connected to the first piston and mounted to the first tie rod, and a second ram having a second cylinder, a second piston reciprocally housed within the second cylinder, and a second shaft connected to the second cylinder and mounted to the first tie rod. A mounting bracket connects the first and second shafts to the first tie-rod. A tag axle ram assembly is mounted to the tag axle assembly. The tag axle ram assembly comprises a third ram having a third cylinder which is affixed to the frame, a third piston reciprocally housed within the third cylinder, and a third shaft connected to the third piston and mounted to the second tie rod. The tag axle ram assembly also comprises a fourth ram having a fourth cylinder which is affixed to the frame, a fourth piston reciprocally housed within the fourth cylinder, and a fourth shaft connected to the fourth cylinder and mounted to the second tie rod. A mounting bracket connects the third and fourth shafts to the second tie-rod. Preferably, the third and fourth cylinders have a larger diameter than the first and second cylinders. A conduit system fluidly couples the first and second cylinders to the third and fourth cylinders to move a fluid through the conduit system between the steering axle ram assembly and the tag axle ram assembly in response to a turning of the first and second steerable wheels. The conduit system comprises a first conduit connecting the first cylinder to the fourth cylinder, a second conduit connecting the second cylinder to the third cylinder, a third conduit connecting the first cylinder to the second cylinder to maintain a clean air supply between the first and second cylinders, and a fourth conduit connecting the third cylinder to the fourth cylinder to maintain a clean air supply between the third and fourth cylinders. The conduit system is constructed without any flow control valves. A turning of the first and second wheels moves either the first and second piston in a compression stroke and moves the other of the first and second piston in an expansion stroke to move oil through the first and second conduit between the first and second cylinders and the third and fourth cylinders. Air is moved simultaneously through the third and fourth conduits to maintain an equal pressure in the cylinders, which prevents oil leakage from the cylinders. In response to the turning of the first and second wheels, the third and fourth wheels turn in unison at a lesser distance than the first and second steerable wheels due to the smaller diameters of the third and fourth rams.

Other features and advantages of the invention will appear from the following description in which an exemplary embodiment is set forth in detail in conjunction with the accompanying drawings.

DESCRIPTION OF THE SPECIFIC EMBODIMENTS

Figure 1:
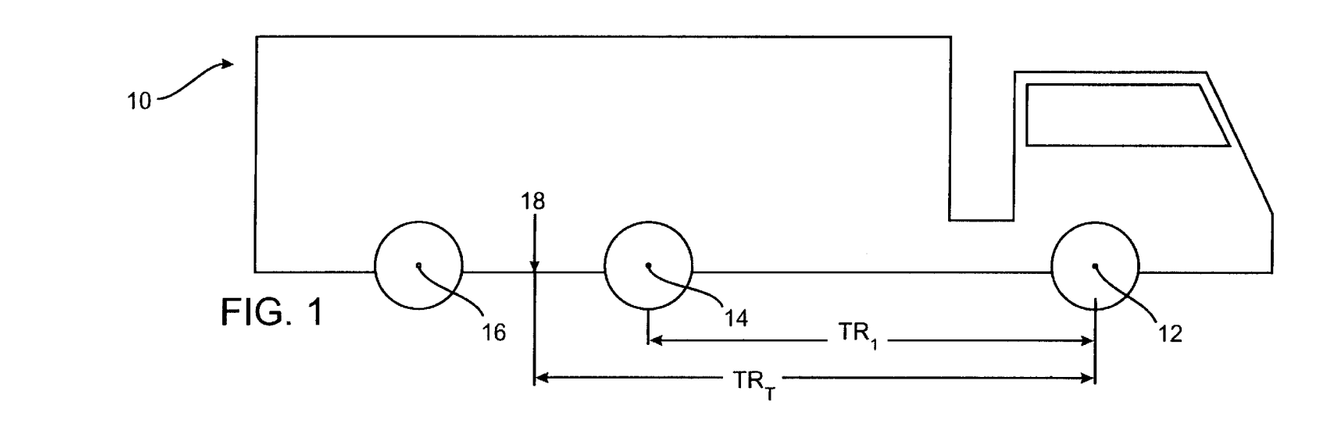
FIG. 1 is an elevational view of a truck having a steering axle, a drive axle and a tag axle.
Figure 2:
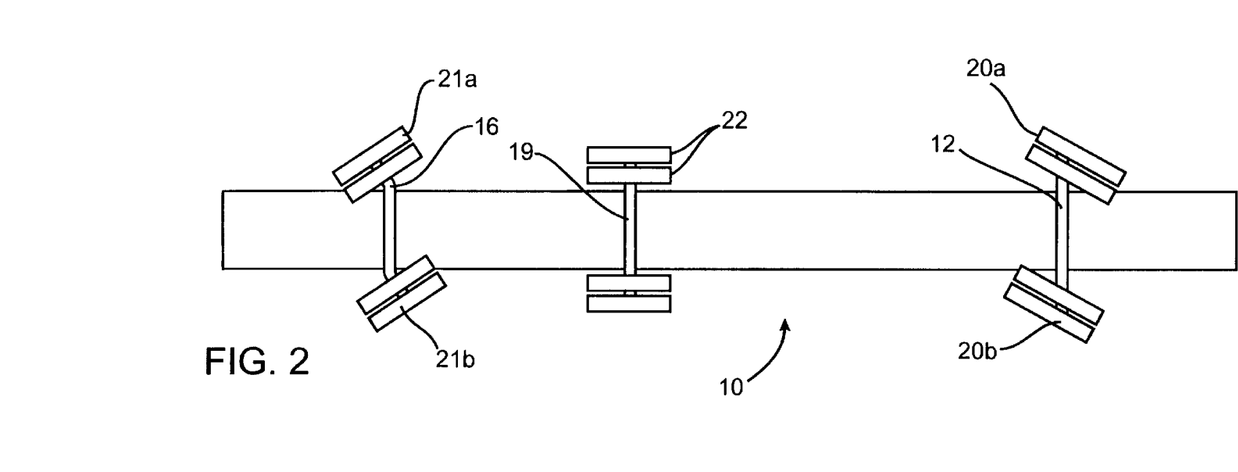
FIG. 2 is a simplified top plan view of the frame and axles of FIG. 1 illustrating the turning of the wheels on the steering axle and the tag axle.

FIGS. 1 and 2 show a vehicle 10 incorporating the present invention. vehicle 10 has a front steering axle 12, a drive axle 14 and a tag axle 16. The distance between front steering axle 12 and center point 18 between the drive axle 14 and the tag axle 16 defines the theoretical turning radius $TR_T$ of vehicle having a rear tag axle. Often however, the actual turning radius of the vehicle is greater than the theoretical turning radius $TR_T$ since drive tires 22 push the front steering tires 20 during the turning of the vehicle. Because the steerable tag axle wheels 21 of the present invention assists in the turning of the vehicle and forces the drive tires 22 to turn, instead of allowing the drive tires to follow or push the front steering tires 20, the steerable tag axle decreases the theoretical turning radius. Accordingly, for vehicles having a steerable tag axle of the present invention, the steering radius is defined by the distance $TR_1$ between the front steering axle 12 and the drive axle 14 (See FIG. 7). FIG. 2 is a top plan view of the vehicle 10 wherein the first and second wheels 20a, 20b are turned to the right. As will be described in more detail below, the third and fourth wheels on the tag axle 21a, 21b are coupled to the first and second wheels 20a, 20b in a master-slave configuration such that the rear tag axle wheels 21a, 21b turn in the opposite direction (in this case, to the left) in response to the turning of the first and second wheels.

Figure 3:
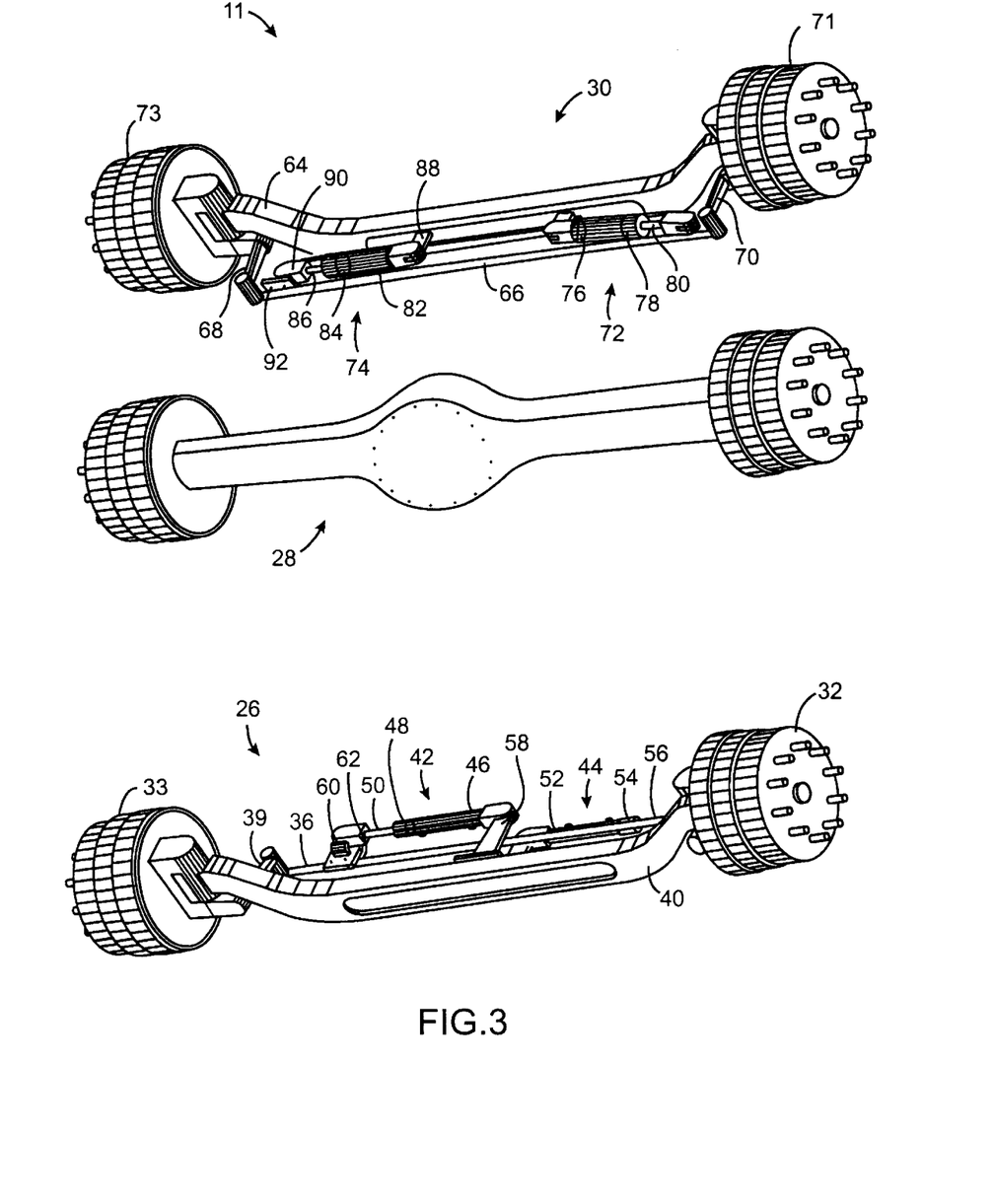
FIG. 3 is a perspective view of an exemplary embodiment of the present invention having a steering axle ram assembly and a tag axle ram assembly.

Referring now to FIG. 3, a steering system 11 of the present invention comprises a front steering assembly 26, a drive assembly 28, and a steerable tag axle assembly 30. The front steering assembly 26 is typically a conventional Ackerman steering system in which spindles 32, 33 are mounted on pivoted knuckle arms 34 and a steering linkage (not shown) pivots the front spindles 32, 33 through a tie rod 36 which links the knuckle arms 34. The tie rod is preferably a tubular or solid rod which extends between the knuckle arms and substantially parallel to the axis of rotation of the wheels 38. Steering axle ram assembly 26 is operatively coupled to both a first tie rod 36 and a frame element 40.

The steering axle ram assembly 26 preferably comprises a first ram 42 and a second ram 44. The first ram 42 includes a first cylinder 46, a first piston 48 reciprocally housed within the first cylinder, and a first shaft 50 connected to the first piston. (See FIG. 6). Likewise, the second ram 44 includes a second cylinder 52, a second piston 54 reciprocally housed within the second cylinder, and a second shaft 56 connected to the second piston. The first and second cylinders 48, 52 are preferably mounted to the frame element 40 through mild steel brackets or plates 58. Normally, the brackets are bolted onto the cylinder and frame element, but alternatively can be riveted, screwed, welded, forged, or cast. As further shown in FIGS. 3 and 4, the shaft ends 50, 56 usually mount to the tie rod through a bracket 60 and U-bolts 62. Alternatively, the cylinders can be mounted to the first tie rod 36 and the shafts can be mounted to the frame element 40. Naturally, it will be appreciated that other methods can be used to mount the cylinder and shaft to the frame element and tie rod. The cylinder and shafts are mounted in a manner in which movement of the first tie rod and the turning of the first and second wheels move the pistons within the cylinder. As will be described in more detail below, the movement of the first and second pistons moves a hydraulic fluid between the first and second rams 42, 44 and the tag axle assembly 30.

Often the combined length of the first and second cylinders are longer than the frame element 40 and/or the first tie rod 36. Thus, the cylinders can be staggered and overlapped. As shown in FIG. 3, the first ram 42 is mounted over the second ram 44. In order to prevent hampering the normal movement of the first tie rod 36, the first and second rams can be mounted substantially parallel to the first tie-rod. While frame element 36 is shown as being an axle, it will be appreciated that the frame element can be any stable portion of the vehicle, and includes, but is not limited to the chassis, an axle, turntable, dolly, and the like.

A tag axle ram assembly 30 is operatively coupled to both a frame element 64 and a second tie rod 66 that couples the rear knuckle arms 68, 70 (and rear spindles 71, 73). The tag axle ram assembly 30 comprises a third ram 72 and a fourth ram 74. The third ram includes a third cylinder 76, a third piston 78 reciprocally housed within the third cylinder and a third shaft 80 connected to the third piston. Similarly, the fourth ram 74 includes a fourth cylinder 82, a fourth piston 84 reciprocally housed within the fourth cylinder, and a fourth shaft 86 connected to the fourth piston. Due to the lack of space in the rear area of vehicles, the cylinders are often mounted along a common axis in between the axle 64 and the second tie rod 66. Both the third and fourth cylinder are preferably mounted substantially parallel to the second tie rod to prevent the binding of the tie rod during turning. Similar to above, mounting plates 88 can mount the cylinder to the frame element 64 and brackets 90 and U-bolts 92 can mount the shaft ends to the second tie rod.

Figure 4:
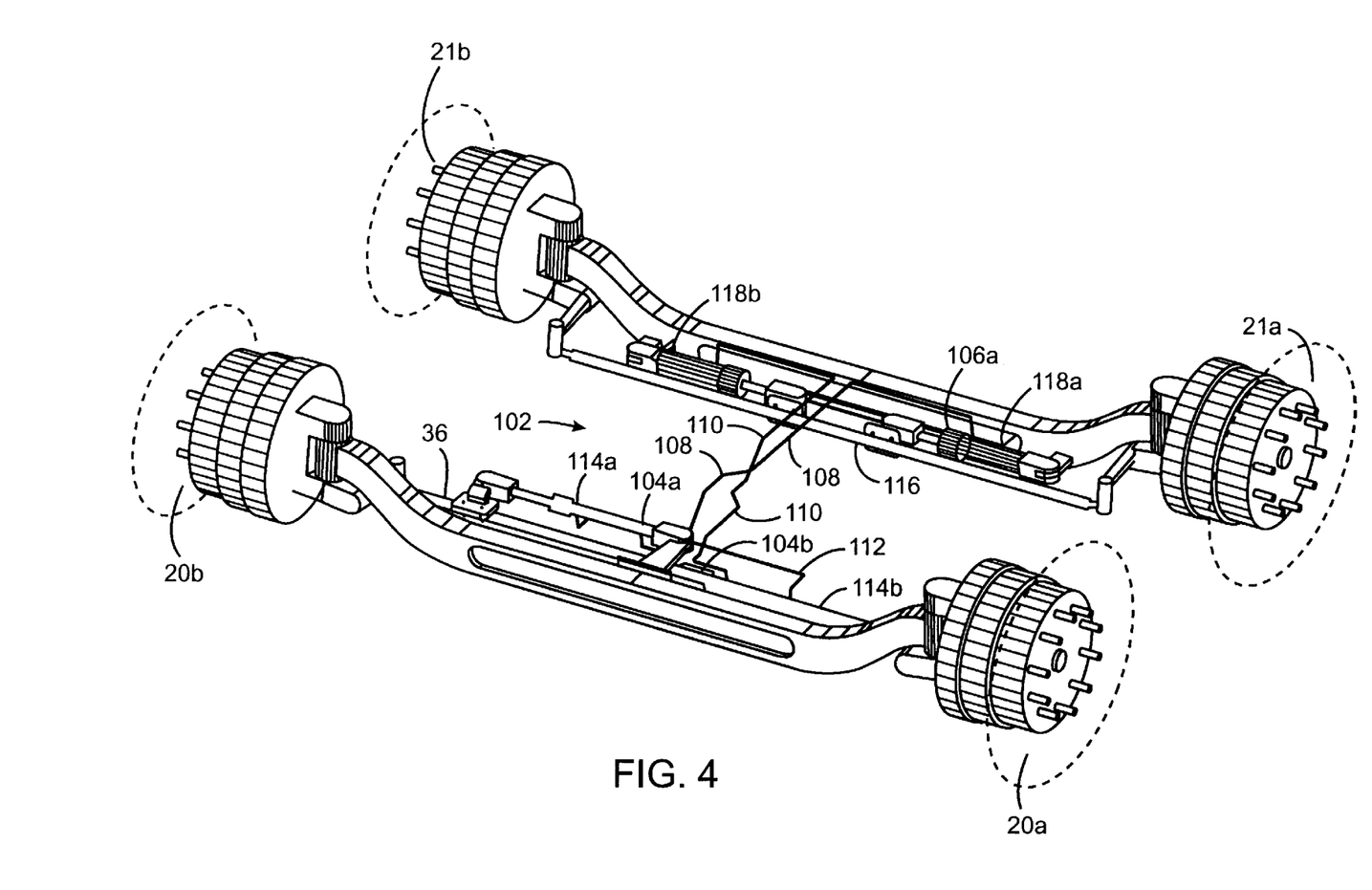
FIG. 4 is a perspective view of an embodiment of the front axle ram assembly and the tag axle assembly having a conduit system connecting the ram assemblies.
Figure 5:
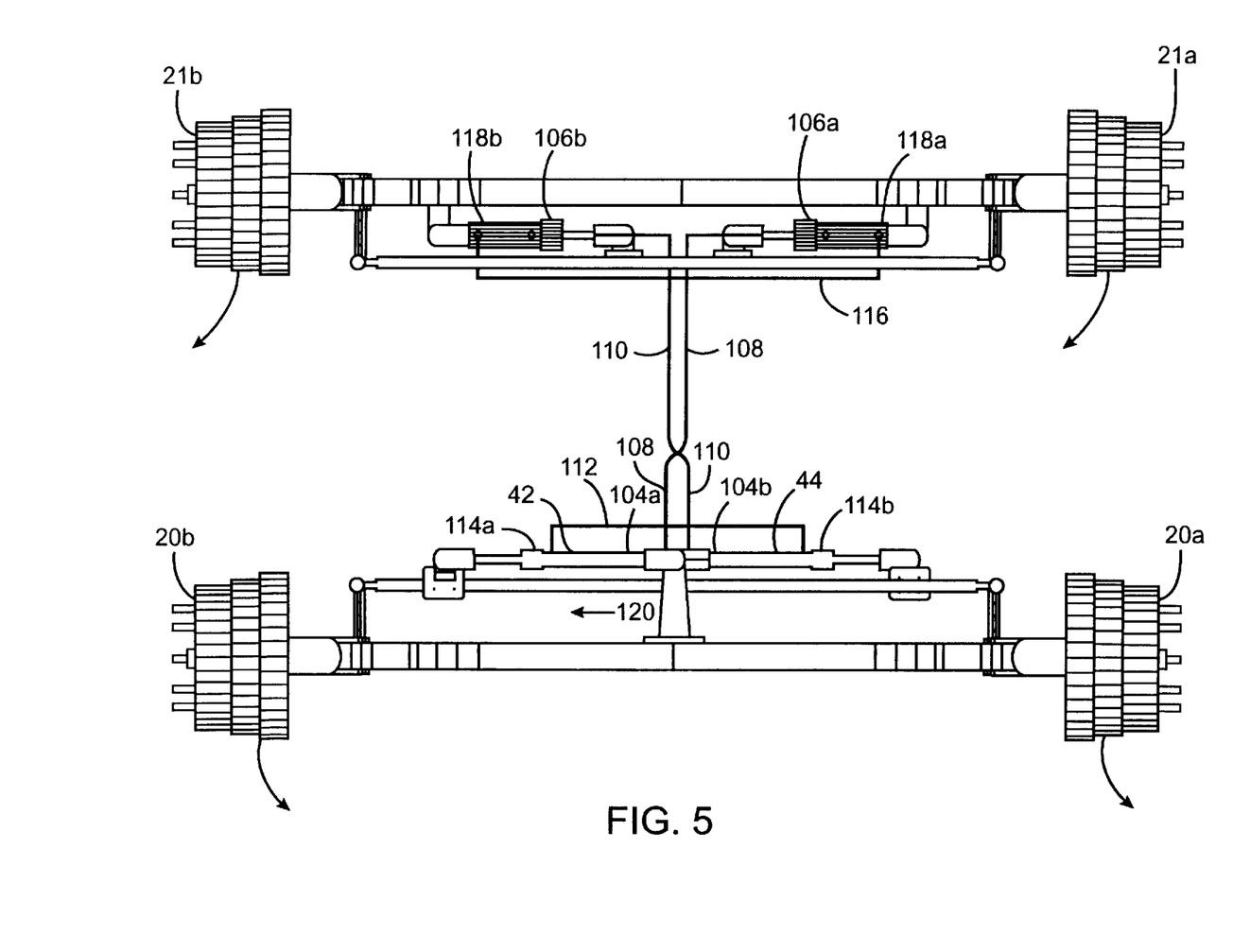
FIG. 5 is a top plan view of the assemblies of FIG. 4.

Referring now to FIGS. 4 and 5, a conduit system 102 is used to hydraulically connect first and second rams 42, 44 to third and fourth rams 72, 74. Conduit system 102 couples steering axle ram assembly 26 and tag axle ram assembly 30 in a master-slave configuration such that third and fourth wheels 21a, 21b turn substantially simultaneously in response to the turning of first and second wheels 20a, 20b.

The rams are mounted in a manner in which the movement of first tie rod 36 (and first and second wheels 20a, 20b) moves first and second pistons 48, 54 within cylinders 46, 52 of first and second ram 42, 44 to move a hydraulic fluid through conduit system 102 to and from third and fourth rams 72, 74. Surprisingly, conduit system 102 functions efficiently without using flow control valves or pumps to control the turning of the tag axle or the flow of the oil.

Typically, the conduits system 102 have a diameter between ¼ inches and ¾ inches and are made of hydraulic tubing, hydraulic hoses, synflex tubing and the like. In an exemplary embodiment conduit system 102 comprises a combination of ⅜ inch hydraulic tubing and hydraulic hoses. An aluminum junction box or bulkhead connection (not shown) is used to connect the hydraulic hoses to the hydraulic tubes. The flexible, short hydraulic hoses allow for suspension movement and are used to connect the cylinders to the hydraulic tubing.

Figure 6:
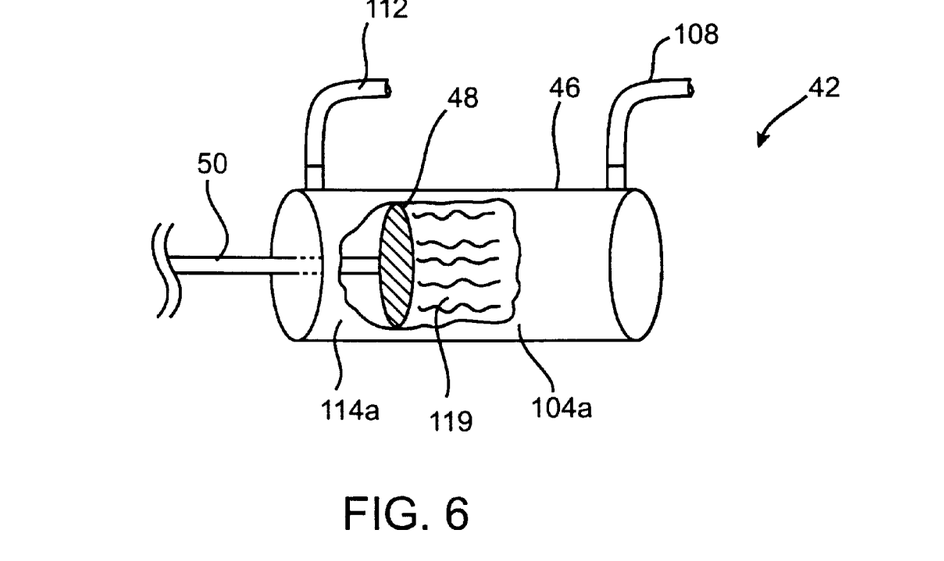
FIG. 6 illustrates a partial cut away view of one of the rams.

Referring now to FIGS. 4–6, cylinders preferably have oil on only one side of the piston. Naturally, it will be appreciated that instead of oil, other mediums, such as any non-corrosive fluid that will not react to the piston seals, A.T.F., brake fluid, silicone fluid, air, water or the like can be used. In the first and second rams 42, 44, there is oil in only the back or piston side 104a, 104b. Third and fourth rams 72, 74, have oil in only the front or shaft side 106a, 106b. A first conduit 108 connects the piston side of the first ram 104a to the shaft side of the third ram 106a to move the oil between the rams. A second conduit 110 fluidly connects the piston side of the second ram 104b to the shaft side of the fourth ram 106b to transfer the oil between the rams. A third conduit 112 connects the shaft side of the first ram 114a to the shaft side of the second ram 114b to help maintain a clean air supply and an equal air pressure in the rams. Similarly, fourth conduit 116 connects the piston side of the third ram 118a to the piston side of the fourth cylinder 118b to help maintain a clean air supply and an equal air pressure in the third and fourth rams. As shown most clearly in FIG. 6, which shows a partial cut away of the first ram, a hydraulic fluid 119 is contained only in the piston side 104a of the first cylinder, and as the first shaft 50 and first piston 48 compress, the hydraulic fluid is moved through the first conduit 108 toward the third ram. As the ram is compressed air is moved through the third conduit 112 to balance the pressure and to help prevent leakage of the hydraulic fluid. Naturally, it will be appreciated that alternative conduit systems can comprise only the first and second conduits 108, 110, and the third and fourth conduits 112, 116 can be left out of the system. In such systems, the rams will be balanced by the atmospheric pressure.

Referring again to FIG. 5, as an illustration, when a user wants to turn the vehicle to the right, first tie rod 36 is moved to the left with a steering linkage (not shown). As first tie rod 36 is moved to the left, as illustrated by the arrow 120, second piston 52 moves in a compression stroke and first piston 48 moves in an expansion stroke. Compression of second piston 52 forces oil from the piston side of the second ram 104b through second conduit 110 to the shaft side of the fourth ram 106b, which causes the fourth piston 84 to compress. Compression of fourth piston 84 urges second tie rod 36 to the left and the third and fourth wheels 21a, 21b to the left. As first piston is simultaneously moved in an expansion stroke (by the movement of first tie rod 36), oil is drawn from the shaft side of the third ram 106a and causes third piston 78 to expand, which further helps urge second tie rod 66 (and the third and fourth wheels 21a, 21b) to the left.

As the present invention uses a closed system for the controlled transfer of fluid between the front ram assembly and the tag axle ram assembly, it is preferable that first and second ram 42, 44 have substantially the same volume as third and fourth ram 72, 74. However, this does not require that the rams have the exact same dimensions. To the contrary, it has been found that it is preferable to have the first and second rams 42, 44 to have a smaller diameter and a larger stroke than the third and fourth rams 74, 76. This allows the rear wheels 21a, 21b to turn less than the first and second wheels 20a, 20b. The turn ratio between the front wheels and the tag axle wheels can vary and is highly dependent on the configuration of the vehicle. The turn ratio is generally determined by the relative distance between the front steering axle 12 and the pivot or drive axle 14, and the distance between the steerable tag axle 16 and the drive axle 14. Since the normal configuration of a truck usually has the front steering axle 12 a farther distance from the drive axle 14 than the steerable tag axle 16, the front steering axle 12 must turn sharper to maintain the same radius as the closer tag axle 16.

To allow the first and second wheels 20a, 20b to turn a farther distance than the third and fourth wheels 21a, 21b, the diameter of the first and second rams 42, 44 can be reduced and the stroke of the first and second rams can be increased a corresponding length, to maintain approximately the same overall volume as the third and fourth rams 74, 76. By having the diameter of the first and second rams smaller than the diameter of the third and fourth rams, the first and second wheels can turn farther than the third and fourth wheels. It will be appreciated that the difference in the dimensions of the rams can be tailored to provide almost any selected turning ratio.

Figure 7:
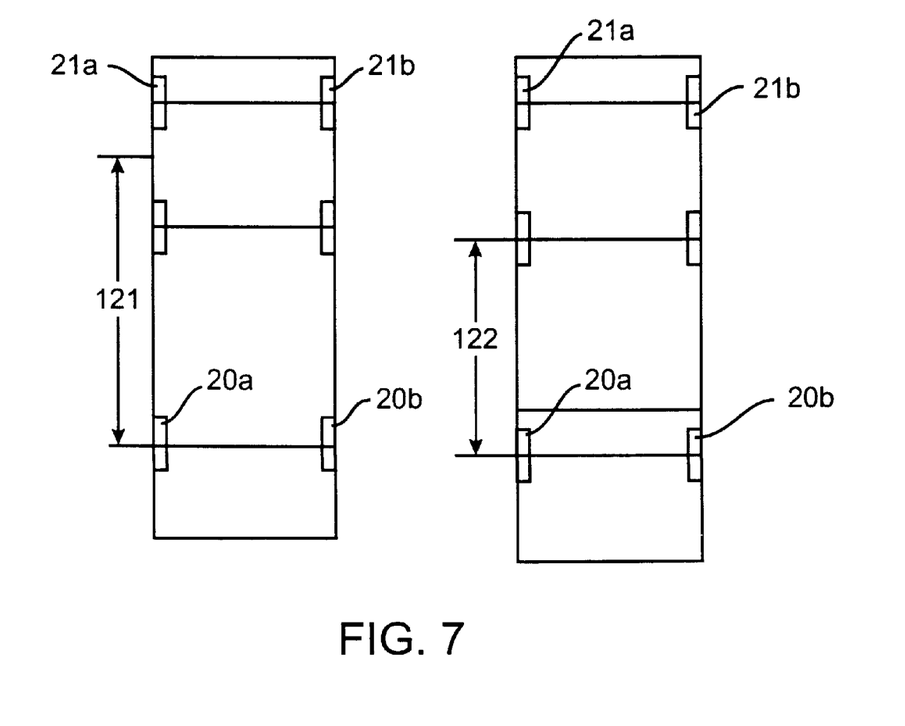
FIG. 7 shows the turning radius of a vehicle with and without the steerable tag axle.

In one specific embodiment, tests were conducted on a Class 7 Truck which had a wheel base of 187 inches and a tag axle mounted 60 inches rearward of the drive axle. It was determined that a turning ratio of the front steering assembly to the tag axle assembly should be 2.66:1. The front axle wheels were allowed to turn four inches from center to full right or left turn and the tag axle assembly was allowed to turn one-and-one-half inches from center to full right or left turn. To keep the volume of the first and second rams substantially equal to the volume of the third and fourth rams, the first and second ram had a one and one half inch (1.5") bore and an eight inch (8") stroke. In contrast, the third and fourth rams had a two and one half inch (2.5") bore and a three inch (3") stroke. As shown in FIG. 7 with a conventional tag axle, a vehicle would typically have a steering radius defined by 121. However, with a steerable tag axle of the present invention, the vehicle will have a steering radius defined by 122. The steerable tag axle assembly reduced the steering radius of the Class 7 disposal truck by approximately two feet. The steerable tag axle assembly provided a tighter turning radius, better maneuverability and greater stability as opposed to vehicles having fixed tag axles.

Further tests showed that the steerable tag axle increased tire life by reducing tire scuffing. By having the rear tag axles steerable, instead of self steering, there was significantly less tire scuffing. Class 7 trucks using conventional tag axles typically replace its tires approximately every nine months. In comparison, it is expected that the wheels of the Class 7 trucks having the steerable tag axles of the present invention will have a life-span of at least eighteen months.

The present invention also reduces the steering radius of the vehicle as it moves in reverse. Because the steerable tag axle assembly 30 of the present invention is fluidly coupled to front steering assembly 26 in a master-slave configuration, the tag axle can be steered in the correct direction without any modifications to the system. If a driver wishes to move in reverse, the driver merely has to turn the first and second wheels 20a, 20b in the desired direction. The third and fourth wheels 21a, 21b will turn simultaneously in the opposite direction of the first and second wheels 20a, 20b, and the vehicle can move in reverse in the desired direction.

Modification and variation can be made to disclose the embodiment without departing from the subject of the invention as defined in the following claims. For example, the conduit system can comprise pressure relief valves. Also, instead of mounting the cylinders to the frame element and the shafts to the tie rod, the cylinders can be mounted to tie rod and the shafts can be mounted to the frame element. Moreover, instead of mounting the shafts and/or cylinders to the tie rods, the shafts and/or cylinders can be directly mounted to the knuckle arm. Naturally, it is also within the scope of the invention to have the hydraulic fluid in different sides of the piston, or to change the orientation of the pistons. Any and all patents, patent applications, and printed publications referred to above are incorporated by reference.

What is claimed is:

1. An improved steering assembly for a vehicle of the type having a frame, a steering axle assembly mounted to the frame and a tag axle assembly mounted to the frame, the steering axle assembly comprising first and second steerable wheels and a first tie rod operatively connecting the first and second steerable wheels, the tag axle assembly comprising third and fourth wheels and a second tie rod operatively connecting the third and fourth wheels, the improvement comprising:

a steering axle ram assembly comprising:
  a first cylinder, a first piston reciprocally housed within the first cylinder, and a first shaft connected to the first piston; and
  a second cylinder, a second piston reciprocally housed within the second cylinder, and a second shaft connected to the second piston;
  wherein each cylinder has a diameter;
  wherein the first and second cylinders are affixed to a chosen one of the frame and the first tie rod and the first and second shafts are affixed to the other of the frame and the first tie rod;

a tag axle ram assembly comprising:
  a third cylinder, a third piston reciprocally housed within the third cylinder, and a third shaft connected to the third piston; and
  a fourth cylinder, a fourth piston reciprocally housed within the fourth cylinder, and a fourth shaft connected to the fourth piston;
  wherein each cylinder has a diameter;
  wherein the third and fourth cylinders are affixed to a chosen one of the frame and the second tie rod and the third and fourth shafts are affixed to the other of the frame and the second tie rod;

the third and fourth cylinders having larger diameters than the first and second cylinders; and a conduit system fluidly coupling (1) the first and third cylinders, and (2) the second and fourth cylinders, so a fluid moves through the conduit system between the steering axle ram assembly and the tag axle ram assembly in response to a turning of the first and second steerable wheels, wherein the third and fourth wheels turn in unison with the first and second steerable wheels at lesser distance than the first and second steerable wheels.

2. The assembly of claim 1, wherein the first cylinder, second cylinder, third cylinder and fourth cylinder have approximately the same volume.

3. The assembly of claim 1, wherein the first and second cylinders are substantially parallel to the first tie rod and the third and fourth cylinders are substantially parallel to the second tie rod.

4. The assembly of claim 1, wherein one of the first cylinder and second cylinder is mounted above the first tie rod, and the other of the first and second cylinders is mounted below the first tie rod.

5. The assembly of claim 1, wherein the third and fourth cylinders are mounted between the second tie rod and the frame.

6. The assembly of claim 1, wherein the third and fourth cylinders are mounted along a common axis.

7. The assembly of claim 1, wherein the shafts are rotatably mounted to the tie rods through brackets, the brackets comprising:
   a connecting member rotatably connected to the shafts; and
   a U-bolt for coupling the connecting member to the tie rods.

8. The assembly of claim 1, wherein each cylinder further comprises a piston side and a shaft side, wherein each cylinder has oil in only one of the piston side and the shaft side.

9. The assembly of claim 1, wherein the first and second cylinders have oil in the piston side.

10. The assembly of claim 9, wherein the third and fourth cylinders have oil in the shaft side.

11. The assembly of claim 1, wherein the first and second wheels turn approximately 2.6 times as far as the third and fourth wheels.

12. The assembly of claim 1 wherein the conduit system comprises:
    a first conduit connecting the piston side of the first cylinder to the shaft side of the third cylinder; and
    a second conduit connecting the piston side of the second cylinder to the shaft side of the fourth cylinder;
    wherein the turning of the first and second wheels compress one of the first and second pistons and expands the other of the first and second pistons to move oil through the first and second conduit between the first and second cylinders and the third and fourth cylinders.

13. The assembly of claim 12, wherein the conduit system further comprises:
    a third conduit connecting the shaft side of the first cylinder to the shaft side of the second cylinder; and
    a fourth conduit connecting the piston side of the third cylinder to the piston side of the fourth cylinder, wherein the turning of the first and second wheels moves air through the third and fourth conduits.

14. The assembly of claim 13, wherein the third conduit comprises means for maintaining an equal air pressure in the first and second cylinders, and wherein the fourth conduit comprises means for maintaining an equal air pressure in the third and fourth cylinders.

15. An improved vehicle of the type having a frame, a steering axle assembly mounted to said frame and a tag axle assembly mounted to said frame, said steering axle assembly comprising first and second steerable wheels and a first tie rod operatively connecting said first and second steerable wheels, said tag axle assembly comprising third and fourth wheels and a second tie rod operatively connecting said third and fourth wheels, the improvement comprising:

a steering axle ram assembly comprising:
   a first cylinder, a first piston reciprocally housed within said first cylinder, and a first shaft connected to said first piston; and
   a second cylinder, a second piston reciprocally housed within said second cylinder, and a second shaft connected to said second piston;
   wherein each cylinder has a diameter;
   wherein said first and second cylinders are affixed to a chosen one of said frame and said first tie rod and said first and second shafts are affixed to said other of said frame and said first tie rod;

a tag axle ram assembly comprising:
   a third cylinder, a third piston reciprocally housed within said third cylinder, and a third shaft connected to said third piston; and
   a fourth cylinder, a fourth piston reciprocally housed within said fourth cylinder, and a fourth shaft connected to said fourth piston;
   wherein each cylinder has a diameter;
   wherein said third and fourth cylinders are affixed to a chosen one of said frame and said second tie rod and said third and fourth shafts are affixed to said other of said frame and said second tie rod;

said third and fourth cylinders having larger diameters than said first and second cylinders; and a conduit system fluidly coupling (1) said first and third cylinders, and (2) said second and third cylinders, so a fluid moves through said conduit system between said steering axle ram assembly and said tag axle ram assembly in response to a turning of said first and second steerable wheels, wherein said third and fourth wheels turn in unison with said first and second steerable wheels a lesser distance than said first and second steerable wheels, wherein said conduit system is constructed without any flow control valves.

16. A steerable tag axle kit for use with a vehicle having a having a frame, a steering axle assembly and a tag axle assembly mounted to said frame, said steering axle assembly comprising first and second steerable wheels and a first tie rod operatively connecting said first and second steerable wheels, said tag axle assembly comprising third and fourth wheels and a second tie rod operatively connecting said third and fourth wheels, said kit comprising:

a steering axle ram assembly comprising:
   a first cylinder affixed to said frame, a first piston reciprocally housed within said first cylinder, and a first shaft connected to said first piston, said first shaft rotatably mounted to said first tie rod; and
   a second cylinder, a second piston reciprocally housed within said second cylinder, and a second shaft connected to said second cylinder, said second shaft rotatably mounted to said first tie rod;
   a mounting bracket connecting said first and second shafts to said first tie-rod;
   wherein each cylinder has a diameter;

a tag axle ram assembly comprising:
   a third cylinder affixed to said frame, a third piston reciprocally housed within said third cylinder, and a third shaft connected to said third piston, said third shaft rotatably mounted to said second tie rod; and
   a fourth cylinder affixed to said frame, a fourth piston reciprocally housed within said fourth cylinder, and a fourth shaft connected to said fourth cylinder, said fourth shaft rotatably mounted to said second tie rod;
   a mounting bracket connecting said third and fourth shafts to said second tie-rod;

wherein each cylinder has a diameter;

said third and fourth cylinders having larger diameters than said first and second cylinders; and a conduit system fluidly coupling said first and second cylinders to said third and fourth cylinders so a fluid moves through said conduit system between said steering axle ram assembly and said tag axle ram assembly in response to a turning of said first and second steerable wheels, said conduit system constructed without any flow control valves, said conduit system comprises:

a first conduit connecting said first cylinder to said third cylinder;

a second conduit connecting said second cylinder to said fourth cylinder;

a third conduit connecting said first cylinder to said second cylinder, wherein said third conduit comprises means for maintaining an equal air pressure in said first and second cylinders; and a fourth conduit connecting said third cylinder to said fourth cylinder, wherein said fourth conduit comprises means for maintaining an equal air pressure in said third and fourth cylinders;

wherein a turning of said first and second wheels moves air through said third and fourth conduits;

wherein a turning of said first and second wheels moves one of said first and second pistons in a compression stroke and moves said other of said first and second pistons in an expansion stroke to move oil through said first and second conduit between said first and second cylinders and said third and fourth cylinders;

wherein said third and fourth wheels turn in unison with said first and second steerable wheels a lesser distance than said first and second steerable wheels.

* * * * *